United States Patent
Komada et al.

[11] Patent Number: 5,923,441
[45] Date of Patent: Jul. 13, 1999

[54] IMAGE RECORD APPARATUS

[75] Inventors: Yasuo Komada; Katsutoshi Ushida, both of Kawasaki, Japan

[73] Assignee: Canon Kabushiki Kaisha, Tokyo, Japan

[21] Appl. No.: 08/616,215

[22] Filed: Mar. 15, 1996

[30] Foreign Application Priority Data

Mar. 16, 1995 [JP] Japan ..................................... 7-084913

[51] Int. Cl.⁶ ............................... H04N 1/00; H04N 1/04
[52] U.S. Cl. .......................... 358/437; 358/498; 271/4.01; 271/121; 271/136; 271/137
[58] Field of Search ..................... 358/488, 496, 358/498, 437; 355/308, 309, 311; 271/4, 8.1, 93, 121, 136, 137, 4.01

[56] References Cited

U.S. PATENT DOCUMENTS

| | | | |
|---|---|---|---|
| 5,019,872 | 5/1991 | Zajac, Jr. | 355/317 |
| 5,379,128 | 1/1995 | Ishida et al. | 358/498 |
| 5,444,555 | 8/1995 | Ono | 358/498 |

FOREIGN PATENT DOCUMENTS

| | | | |
|---|---|---|---|
| 0203367 | 12/1982 | Japan | 358/488 |
| 0181361 | 10/1983 | Japan | 358/480 |

*Primary Examiner*—Jerome Grant, II
*Attorney, Agent, or Firm*—Fitzpatrick, Cella, Harper & Scinto

[57] ABSTRACT

A printer which records an image on a cut paper sheet must normally assure a margin region at the trailing end side of a record paper sheet in terms of the mechanism of the printer. Conventionally, the margin has a considerably large size. However, this invention aims at reducing the margin size as much as possible and increasing the image record region as much as possible.

When a printer of this invention is used in a facsimile apparatus, a problem experienced with a conventional printer, which has a narrow image record region on a record paper sheet, can be prevented. Conventionally, when an image is recorded on a record paper sheet having the same size as that of a received original, the received image is determined as an elongated original image and is divisionally recorded on two record paper sheets, or is recorded on a record paper sheet larger than the received original. This invention prevents this problem.

7 Claims, 9 Drawing Sheets

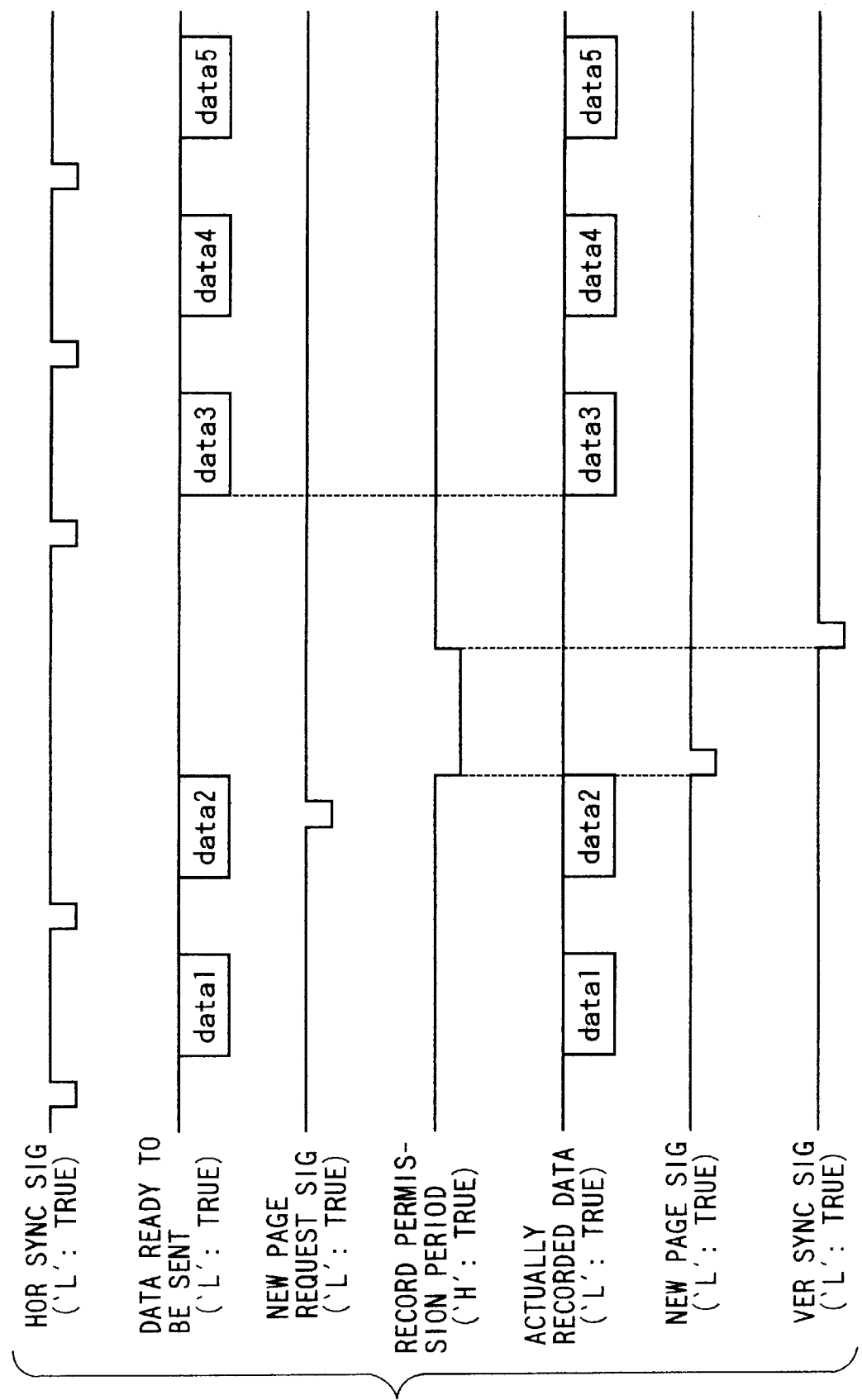

IMAGE RECORD APPARATUS

BACKGROUND OF THE INVENTION

1. Field of the Invention

The present invention relates to an image record apparatus for recording an image using a cut paper sheet having a standard size.

2. Related Background Art

A conventional image record apparatus which uses a standard-size record medium performs a recording operation as follows.

The record medium is set at a predetermined position, and the set record medium is fed from the set position at a predetermined timing in accordance with a record command. The fed record medium is conveyed to a record position by driving a record medium convey motor. A record medium sensor is arranged in the convey path between the record and set positions, and a record control unit detects an instance when the record medium fed from the set position has reached the position of the record medium sensor, thereby recognizing the leading end of the record medium. Simultaneously with the leading end recognition, the record control unit generates a vertical synchronization signal having a predetermined pulse width and supplies it to an image data output control unit so as to adjust the transfer timing of image data on the first record line of the current page. After the record control unit outputs at least the vertical synchronization signal, it generates a horizontal synchronization signal with a predetermined pulse width and supplies it to the image data output control unit so as to adjust the transfer timing of image data from the start pixel position of each line in correspondence with the convey operation of the record medium. Note that the record medium is conveyed at a predetermined speed at least during an interval from the leading end recognition of the record medium by the record medium sensor until the leading end of a recordable range (normally smaller than the record medium size since margins are assured at the leading and trailing ends of the record medium) of the record medium.

After the image data output control unit receives the vertical synchronization signal (a synchronization signal in units of pages), it starts a timer counter or a pulse counter for the horizontal synchronization signal (a synchronization signal in units of lines). When the value of the counter has reached a predetermined value and the leading end of the recordable range of the record medium has reached the record position, the image data output control means starts transfer of record image data in response to the horizontal synchronization signal, and the record control unit performs a recording operation in accordance with the image data.

Furthermore, the image data output control unit sets a maximum number of recordable lines for each page in correspondence with the sub-scan length of the record medium on which an image is to be recorded, and transfers record image data in response to the horizontal synchronization signal within the range of the maximum number of recordable lines. If image data to be recorded has a number of lines larger than the maximum number of recordable lines, the image data output control unit transfers record image data corresponding to the maximum number of recordable lines, and thereafter, outputs a new page control signal to the record control unit to set a new page. Then, the image data output control unit transfers record image data corresponding to the remaining lines.

When the record control unit receives record image data falling outside the recordable range of the record medium, the recorded image cannot fall within the recordable range if a recording operation is performed without additional processing. For this reason, image data corresponding to a portion falling outside the recordable range is not recorded but is abandoned.

The trailing end of the recordable range is recognized in such a manner that the record control unit starts a timer by detecting an instance when the trailing end of the record medium has passed the position of the record medium sensor, and detecting the timing at which the value of the timer has reached a predetermined value. Thus, a record operation on a portion falling outside the recordable range of the record medium is prevented, and other constituting units of the record apparatus can be prevented from being contaminated due to a record operation performed without any record medium at the record position.

As described above, in the conventional image record apparatus, the record control unit detects the leading and trailing ends of the recordable range for each record medium. If the record control unit receives image data corresponding to a portion falling outside the recordable range, it does not record the data, i.e., discards the data. In addition, when the record control unit discards data, it does not return any message indicating it to the image data output source side.

For this reason, in order to prevent omission of an image, in consideration of a case wherein the convey speed of the record medium varies to be higher than a normal speed or a case wherein the record control unit determines, due to a variation in leading end & trailing end detection precision of the record medium or shrinkage of the record medium, that the record medium is short, the recordable range set by the record control unit side must be set to be at least equal to or larger than a range defined by the maximum number of recordable lines set by the image data output control unit side.

Therefore, in order to prevent image omission in every case, the image data output control unit must set the maximum number of recordable lines to be considerably smaller than the maximum value of the image record apparatus. For this reason, in a normal case, the margin at the trailing end of an image becomes undesirably large.

SUMMARY OF THE INVENTION

It is an object of the present invention to improve a record apparatus which uses a standard-size cut paper sheet.

It is another object of the present invention to provide an image record apparatus which can prevent image omission even when the image data output control unit sets a maximum number of recordable lines so as to reduce the margin at the trailing end of an image in a normal record operation, in consideration of the above situation.

BRIEF DESCRIPTION OF THE DRAWINGS

FIG. 9 is a timing chart showing the contents according to the third embodiment of the present invention.

DETAILED DESCRIPTION OF THE PREFERRED EMBODIMENTS

Figure 1A:
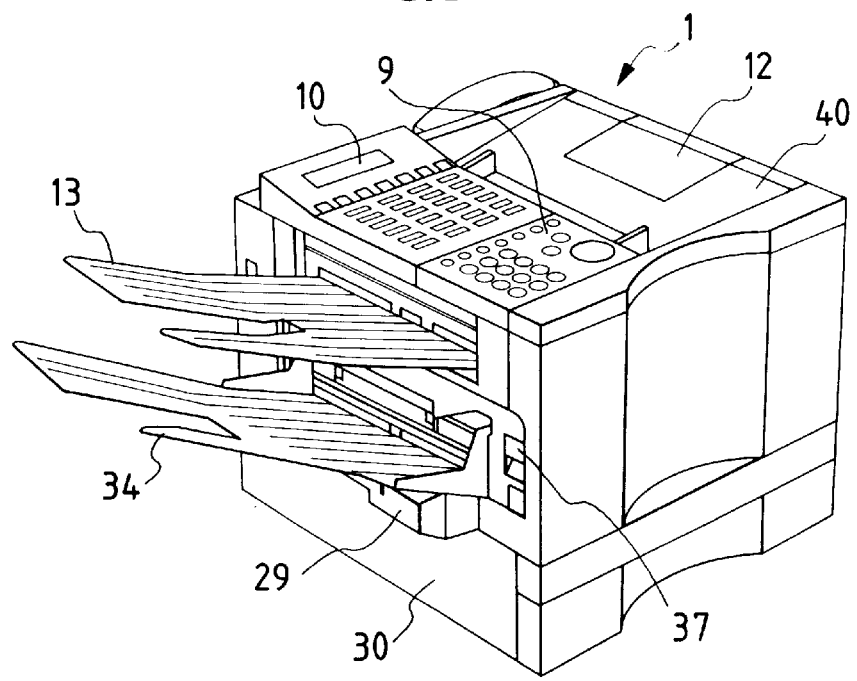
FIGS. 1A and 1B are perspective views showing the outer appearance of a facsimile apparatus to which an embodiment of the present invention is applied.
Figure 1B:
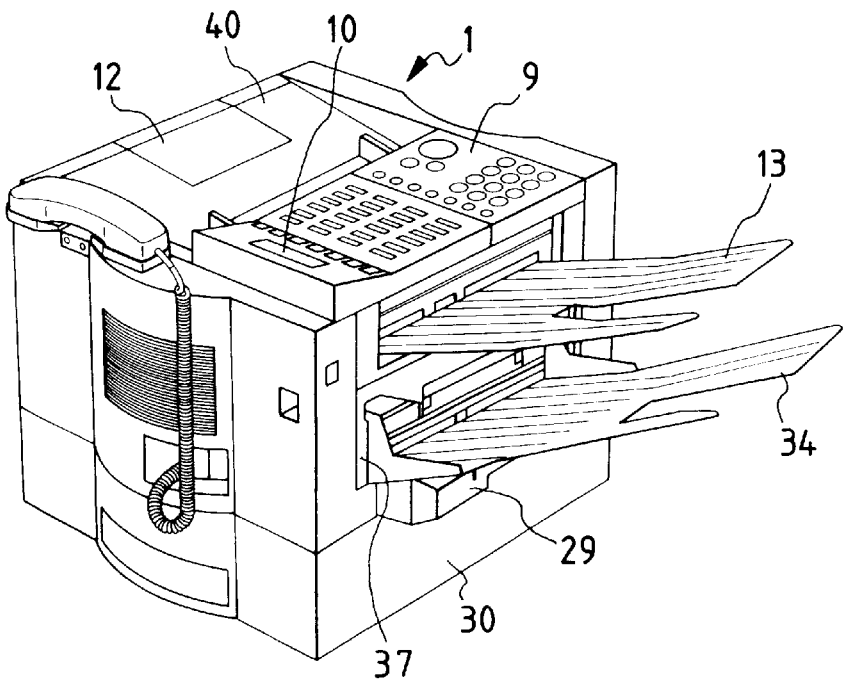
Figure 2:
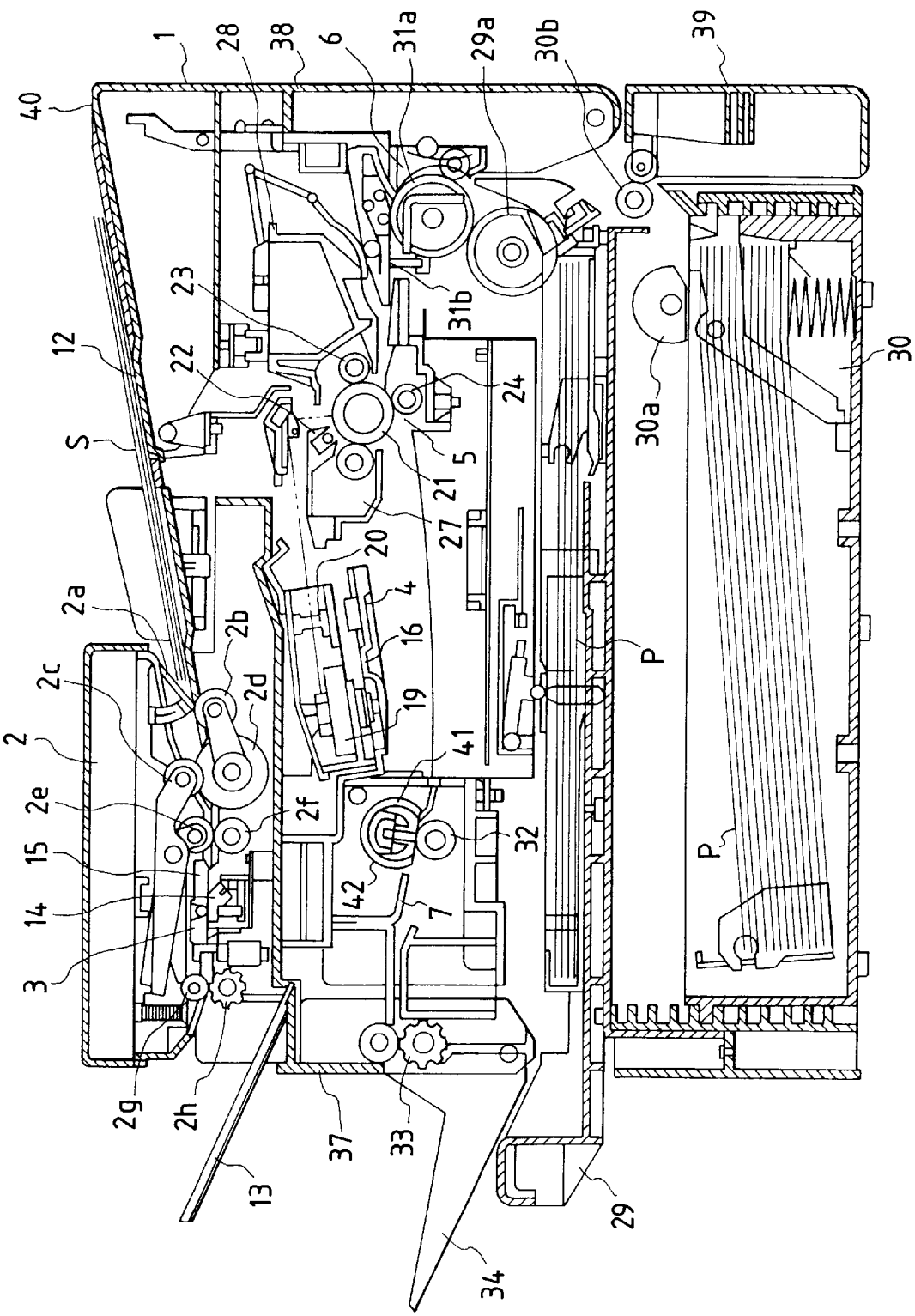
FIG. 2 is a sectional view showing principal part of the facsimile apparatus.

The preferred embodiments of the present invention will be described below with reference to the accompanying drawings.

In the following description, the present invention is applied to a facsimile apparatus.

FIGS. 1A and 1B, and FIGS. 2, 3, and 4 show the arrangement of the facsimile apparatus. Referring to FIGS. 1A to 3, a facsimile apparatus main body 1 includes an original feeder unit 2, a reader unit 3, an optical unit 4, an image forming unit 5, a record medium convey unit 6, an image fixing unit 7, an communication unit (its reference numeral is omitted), a console unit 9, a display unit 10, a control unit 11, and the like.

The original feeder unit 2 separates a plurality of originals S stacked on an original table 12 one by one using a preliminary convey roller 2b which is in press contact with a preliminary convey pressing piece 2a, and a separation roller 2d which is in press contact with a separation pressing piece 2c, and conveys the separated original to the reader unit 3 using a paper feed roller 2f which is in press contact with a paper feed roller 2e. The original S from which image information is read by the reader unit 3 is discharged onto an original discharge tray 13 by discharge rollers 2g and 2h.

The reader unit 3 is constituted by a contact type image sensor 14, an original pressing plate 15, and the like. The contact type image sensor 14 irradiates light onto the image information surface of the original S using an LED array as a light source, and focuses light reflected by the image information surface on a sensor element via a SELFOC lens, thereby reading image information. The image information read by the sensor element is supplied to the control unit, and is subjected to processing such as shading correction, A/D conversion, and the like. Thereafter, the image information is supplied to the optical unit 4 or the communication unit, and is subjected to a record operation in this apparatus or an image communication.

Figure 3:
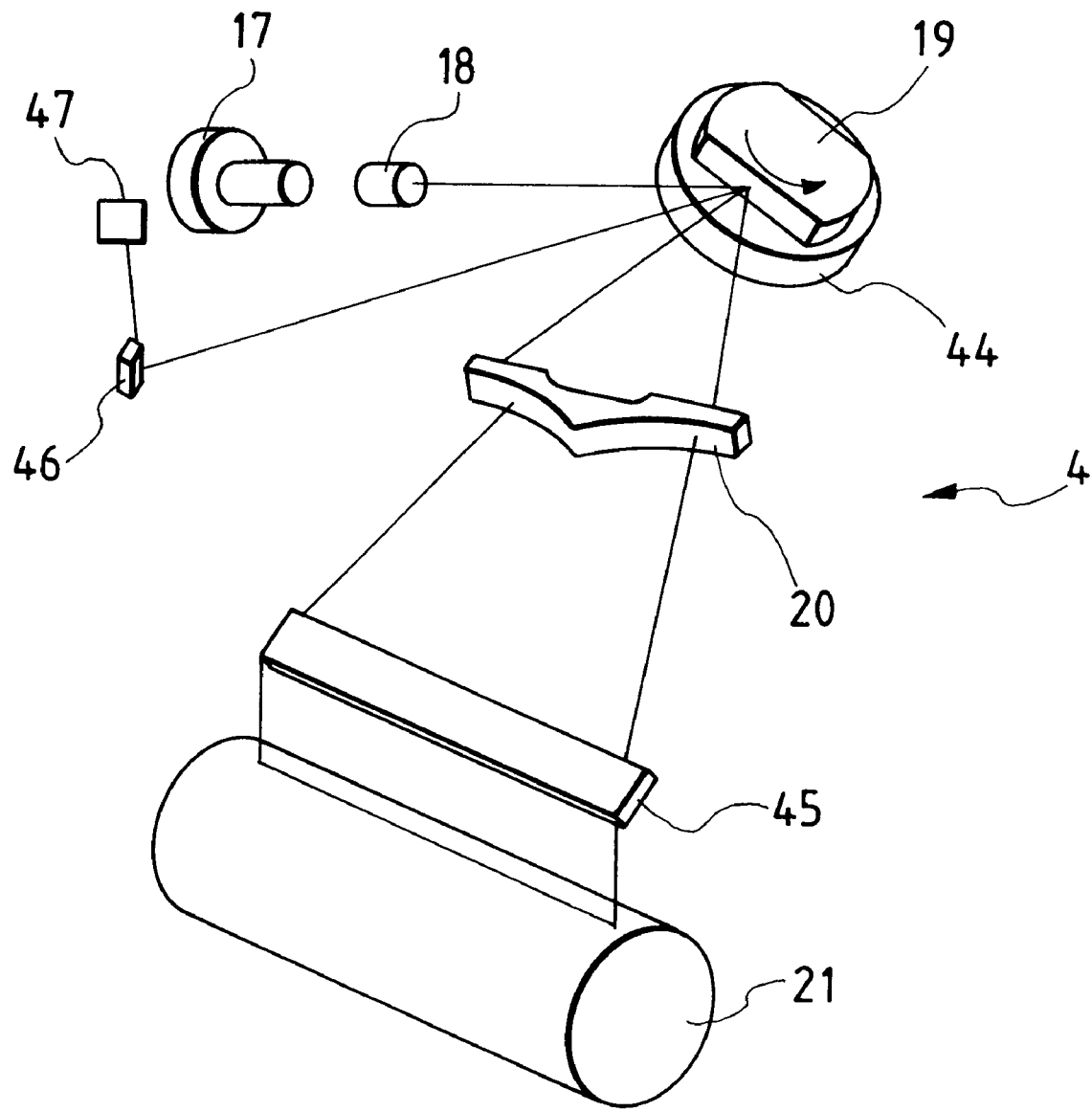
FIG. 3 is a schematic explanatory view of an optical unit of the facsimile apparatus.

FIG. 3 shows the schematic arrangement of the optical unit 4. The optical unit 4 generates a modulated laser beam by controlling a laser diode 17 of a laser scanner 16 (see FIG. 2) to emit light in accordance with an image signal supplied form the control unit. The modulated laser beam is collimated by a collimator lens 18, and is then incident on a polygonal mirror 19, which is rotated at a predetermined speed upon rotation of a polygonal motor M3 (44 in FIG. 3). The laser beam reflected by the polygonal mirror 19 forms a focal point on a photosensitive drum 21 by an imaging lens 20 arranged in front of the polygonal mirror 19 via a mirror 45. The laser beam on the photosensitive drum 21 scans the surface of the photosensitive drum 21 at a predetermined speed. When the photosensitive drum 21 rotates at a predetermined speed and the laser beam scans the surface of the photosensitive drum 21 at the predetermined speed, an electrostatic latent image is formed on the surface of the photosensitive drum 21.

A stationary mirror 46 is arranged in the optical path of the laser beam. The laser beam, which has reached the scan start position, is reflected by the stationary mirror 46, and is incident on a light-receiving element 47. The laser beam incident on the light-receiving element 47 is converted into a current, which is then converted into a voltage to be used in generation of a horizontal synchronization signal.

In the image forming unit 5, a primary charger 22, a developer 23, a transfer charger 24, a blade type cleaning device, and a charge remover are arranged around the photosensitive drum 21 constituted by a conductive drum and a photoconductive layer. The photosensitive drum 21, the primary charger 22, the developer 23, the cleaning device, and the charge remover are integrally stored as a process cartridge 28 which is detachably attached into an attachment member of the apparatus main body 1 together with a recovered developing agent container 27. The photosensitive drum 21, the primary charger 22, a developing sleeve in the developer 23, and the transfer charger 24 are driven by a motor M2 (not shown). The surface of the photosensitive drum 21 driven by the motor is directly and uniformly charged to have a negative potential upon passing the position of the primary charger 22, and is exposed to the laser beam emitted by the laser diode 17. Upon irradiation of the laser beam, negative charges on light portions are neutralized, thus forming an electrostatic latent image. When the electrostatic latent image approaches a developing agent in the developer 23, negatively charged developing agent particles jump onto the surface of the photosensitive drum 21 due to a potential difference between the latent image and the developer 23, thereby visualizing the latent image. Then, positive charges are applied by the transfer charger 24 to transfer the toner image on the photosensitive drum 21 onto a record medium P.

Upon completion of the transfer, the residual toner is removed from the surface of the photosensitive drum 21 by the cleaning device. Thereafter, the surface of the photosensitive drum 21 is charged by the primary charger 22 to have a uniform drum potential, thus preparing for formation of the next electrostatic latent image. The toner removed from the surface of the photosensitive drum 21 is recovered into the recovered developing agent container 27.

In the record medium convey unit 6, first and second cassettes 29 and 30 are loaded into predetermined portions of the apparatus main body 1 so as to be free to be pulled out. Record media P set in the first and second cassettes 29 and 30 are selectively conveyed. In order to convey record media P set in the first cassette 29, the driving force of the motor M2 is transmitted to a semi-circular paper feed roller 29a by driving a paper feed solenoid SL1 (not shown), and record media P are separated one by one upon rotation of the roller 29a. The separated record medium P is conveyed by a convey roller 31a.

In this case, the leading end position of the record medium P, which is being conveyed, is detected by a registration sensor 31b, and the convey timing is adjusted so that the leading end of a toner image formed on the photosensitive drum 21 matches the leading end of the record medium P (i.e., the leading end of an image record region on the record medium P). Then, the record medium P is conveyed by the convey roller 31a to a position between the photosensitive drum 21 and the transfer charger 24.

When record media P set in the second cassette 30 are to be conveyed, the driving force of the motor M2 is transmitted to a semi-circular paper feed roller 30a by driving a paper feed solenoid SL2 (not shown), and record media P are separated one by one upon rotation of the roller 30a. The separated record medium P is conveyed by the convey roller 31a. Thereafter, the medium P is conveyed by the convey roller 31a. In this case, the registration sensor 31b detects the leading end position of the record medium P which is being conveyed, and the convey timing is adjusted, so that the leading end of a toner image formed on the photosensitive drum 21 matches the leading end of the record medium P. Then, the record medium P is conveyed by the convey roller 31a to the position between the photosensitive drum 21 and the transfer charger 24.

The record medium P on which an image has been transferred by the image forming unit 5 is further conveyed by a fixing roller 32 and a discharge roller 33 which are driven by a motor M (not shown), and is discharged onto a record medium discharge tray 34.

Note that a paper feed section and a discharge section respectively comprise a paper feed sensor and a discharge sensor (neither are shown) to detect arrival or passage of the record medium P. When the record medium P does not arrive or pass each sensor within a predetermined period of time, it is determined that a convey error of the record medium P has occurred, and a message indicating this is displayed.

A first lid 37, a second lid 38, a third lid 39, and an upper cover 40 are attached to the apparatus main body 1 to be free to open. The first lid 37 is used for removing a record medium which has jammed at the discharge section, and the second and third lids 38 and 39 are used for removing a record medium which has jammed at the paper feed section. The upper cover 40 is used for removing a record medium which has jammed in the process cartridge 28 and for attaching/detaching the processing cartridge 28.

The image fixing unit 7 is constituted by a heater 41, a fixing film 42, the fixing compression roller 32, the discharge roller 33, and the like. The surface temperature of the heater 41 is detected on the basis of a change in resistance of a thermistor 43, which is in tight contact with the heater 41, and the heater 41 is controlled to have a predetermined surface temperature. The fixing film 42 is heated by the heater 41. The heater has a small heat capacity, and reaches a predetermined fixing temperature before the record medium P reaches the fixing unit.

After the record medium P which is formed with the transferred toner image by the image forming unit 5, is peeled from the photosensitive drum 21, and is conveyed, it enters a fixing nip portion formed by the heater 41 and the fixing compression roller 32. Then, the fixing compression roller 32 presses the toner image on the record medium P against the heater 41 via the fixing film 42. At this time, the toner is softened and melted by heat conducted from the heater 41 and is fixed on the record medium P. The record medium P on which the toner image is fixed is discharged onto the recording medium discharge tray 34.

The communication unit is used for connecting the apparatus main body 1 with a communication line and a communication device such as a telephone set, and performs modulation/demodulation of image communication data, detection of a significant signal, connection/switching of the signal route, and the like.

The console unit 9 comprises a plurality of key input switches, a circuit for detecting a key input, and the like, and is used for inputting the operation instructions of the apparatus and various kinds of information. The display unit 10 displays the state of the apparatus, the telephone number of a party to be called, time information, an operation procedure, and the like.

Figure 4:
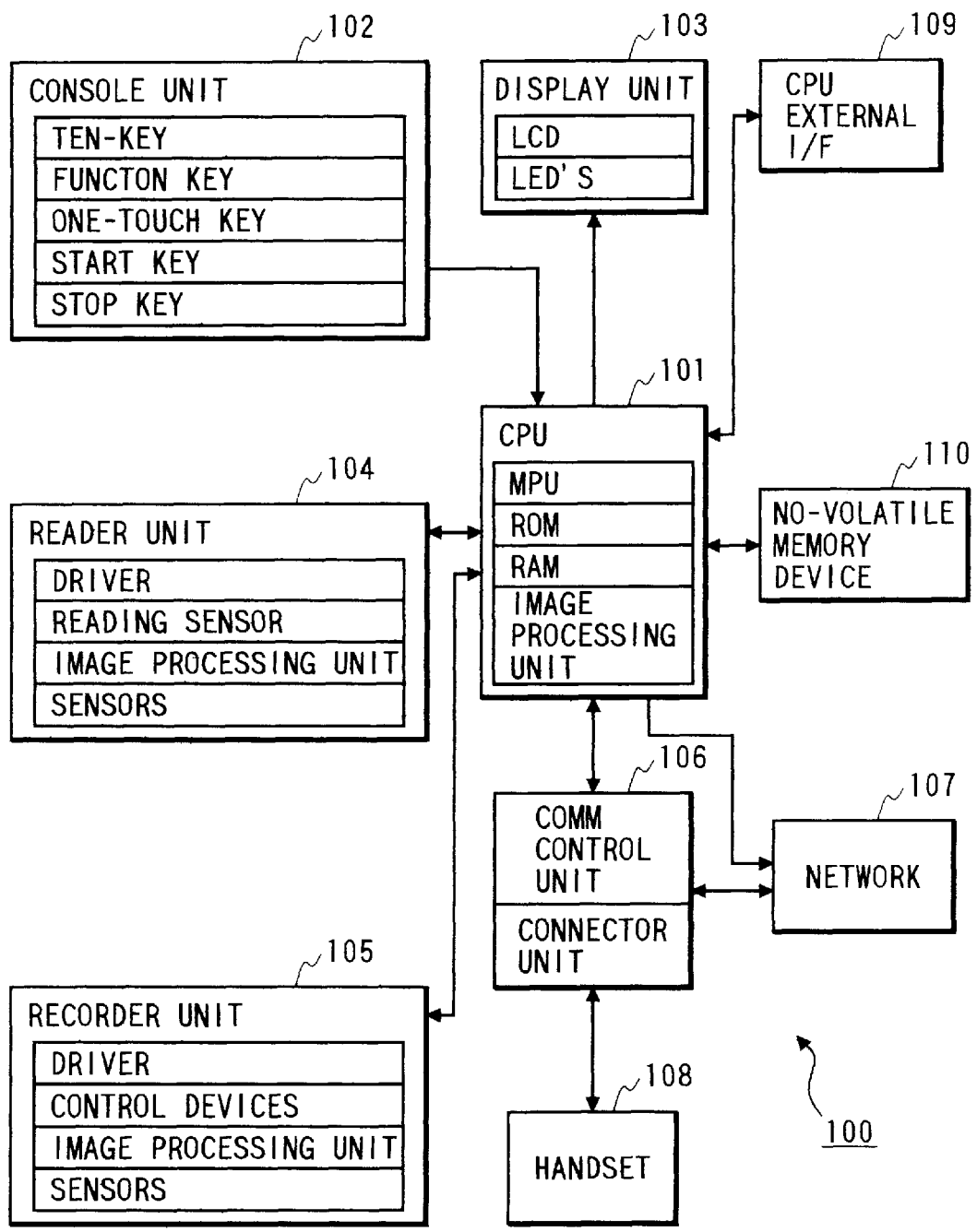
FIG. 4 is a block diagram of a control unit of the facsimile apparatus.

The control unit controls various mechanisms in the apparatus with the above arrangement. FIG. 4 is a block diagram of a control system 100 of the facsimile apparatus. Referring to FIG. 4, a CPU 101 controls the entire facsimile apparatus, and is constituted by an MPU, a ROM which stores instructions that describe the operations of the MPU, a RAM which is used as a work area for various kinds of data processing and as a temporary storage area for image information, an image processing unit for performing zoom processing, resolution conversion processing, and the like of an image, and the like. The CPU 101 has calendar and timepiece functions, and the RAM is protected from inadvertent failures such as a power failure since it is backed up by a battery .

The control unit of the facsimile apparatus is constituted by connecting the above-mentioned CPU 101 and the following elements 102 to 110 via an interface.

A console unit 102 comprises various key switches such as a ten-key pad, function keys, one-touch keys, a start key, a stop key, and the like. A display unit 103 comprises an LCD for displaying various messages, various LEDs for indicating, e.g., a transmission mode, and the like.

A reader unit 104 comprises a driver such as a reading motor, a reading sensor for reading an image, an image processing unit for performing shading processing and binarization processing of the read image, various sensors for detecting, e.g., an original, and the like.

A recorder unit 105 comprises a driver such as a record motor, control devices for controlling the laser scanner and an electrophotography process, an image processing unit for performing, e.g., smoothing processing of an image to be recorded, and various sensors for detecting, e.g., the presence/absence of a record paper sheet.

A communication control unit 106 is a unit for performing call origination, call termination, encoding of image data, and the like, and has a connector unit comprising a DSU and an NCU. The connector unit is connected to a network and a handset.

A CPU external interface (I/F) 109 is an interface for directly transmitting/receiving data to/from the CPU 101, and can connect the apparatus to an external computer via an RS232C interface, a SCSI interface, a LAN, or the like. When the apparatus is connected to the external computer, it is used as a scanner, printer, and a communication means of the external computer. An HDD 110 is a large-capacity nonvolatile storage device used for saving image information, and the like.

Figure 5:
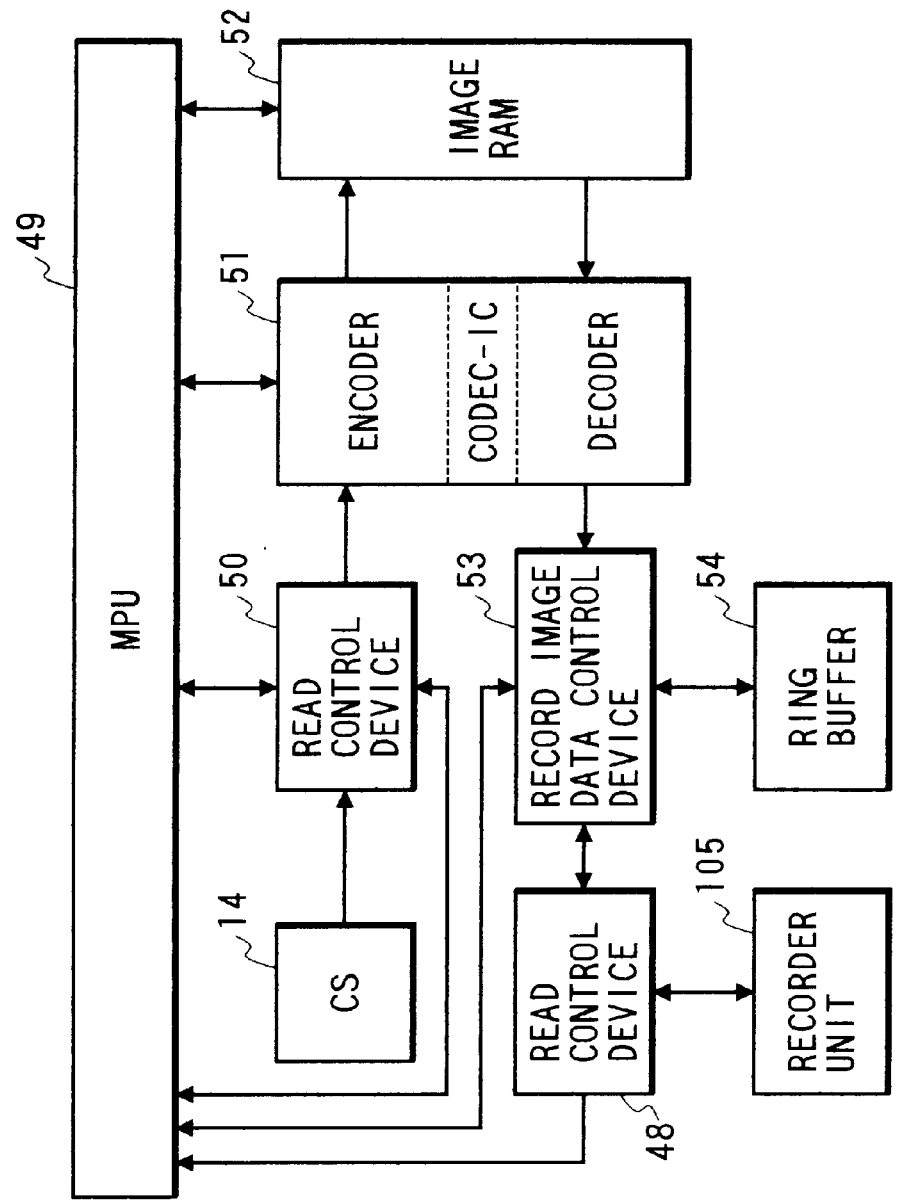
FIG. 5 is a block diagram showing the arrangement corresponding to the embodiment of the present invention in the control unit of the facsimile apparatus.
Figure 6:
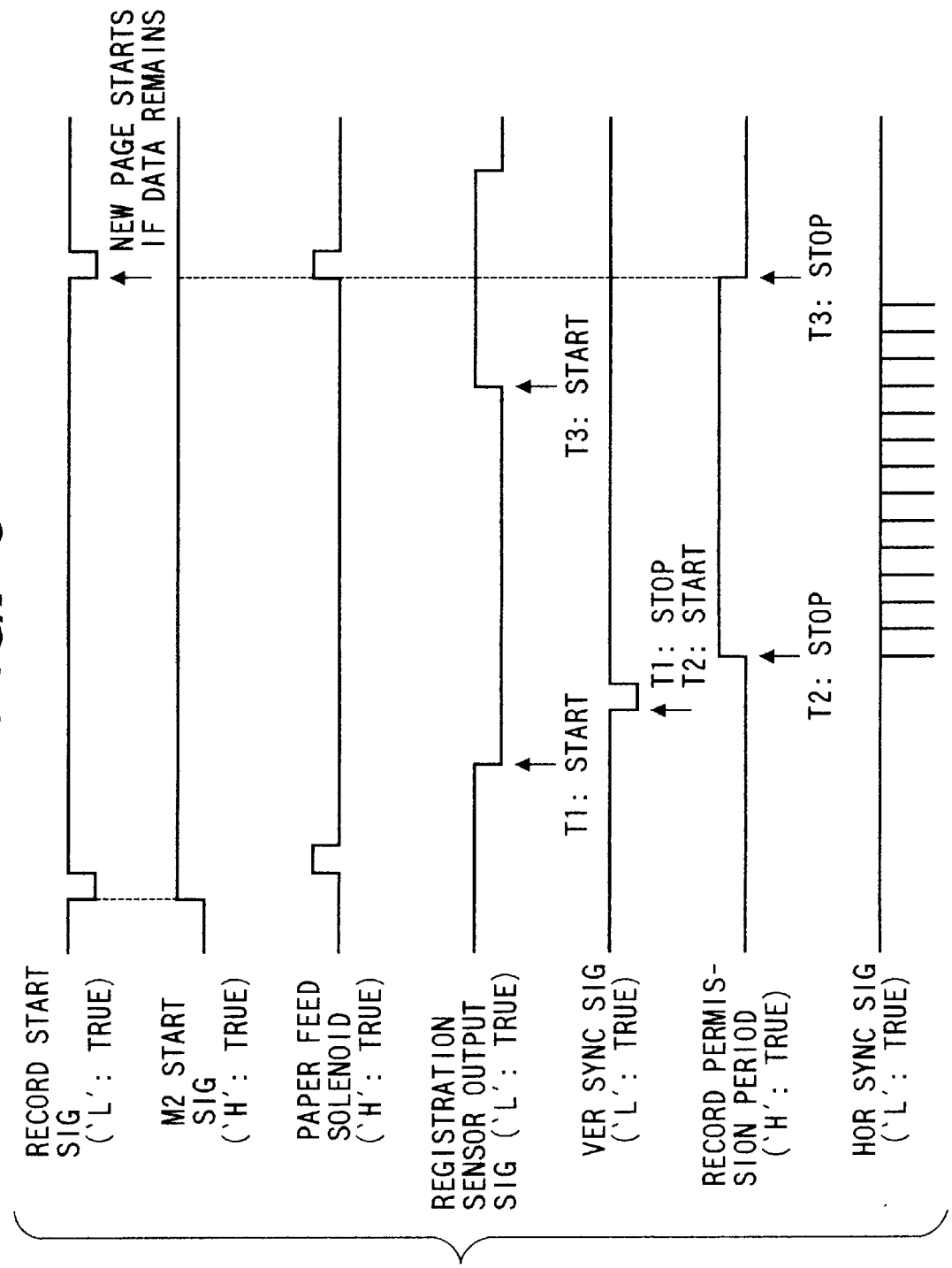
FIG. 6 is a timing chart showing the contents common to the respective embodiments of the present invention.

FIG. 5 is a block diagram showing the control unit according to the embodiment of the present invention in units of functional elements, and FIG. 6 is a timing chart showing the control operation of the control unit.

A record control device (record control unit) 48 exchange signals for performing record control with the optical unit 4, the image forming unit 5, the record medium convey unit 6, the image fixing unit 7, and the like shown in FIGS. 1A to 3 while interfacing with a microprocessor unit (MPU) 49 for controlling the entire facsimile apparatus.

The record control device 48 comprises a ROM which stores various instructions for performing record control, a means for reading out an instruction from the ROM, a processing means for processing the readout instruction, a rewritable RAM for storing information required for the processing means, and an output means for outputting a signal generated by the processing means, and attains control by interactions of these means.

A read control device 50 converts an image read by the contact type image sensor (CS) 14 into digital data at a proper level and performs binarization processing of the digital data by means of image processing.

A CODEC-IC 51 encodes binary data output from the read control device 50 by an MH or MR method, and stores encoded data in an image RAM 52. Data stored in the image RAM 52 is used in the transmission or record operation of an image.

In the record mode, the data in the image RAM 52 is decoded by the CODEC-IC 51, and the decoded data is transferred to a ring buffer 54 including a plurality of line buffers via a record image data control device (image data output control means) 53.

When the ring buffer 54 becomes full of data, a record start signal is supplied to the record control device 48.

In response to the record start signal, the record control device 48 starts the motor M2. Upon completion of the slow-up operation of the motor M2, one of record media P set in the first or second cassette 29 or 30 is separated by the paper feed roller 29a or 30a rotated by the paper feed solenoid SL1 or SL2, and the separated record medium P is conveyed. The record timing of an image on the conveyed record medium P is adjusted by the registration sensor 31b. More specifically, the record medium P operates an actuator (not shown), and the actuator shields the optical path of a photointerrupter used as the registration sensor 31b. With this operation, the record control device 48 detects the leading end of the record medium P.

Simultaneously with the detection of the leading end of the record medium P, the record control device 48 starts a timer counter T1. When the value of the timer counter T1 has reached a predetermined value, the record control device 48 outputs a vertical synchronization signal to the MPU 49. The MPU 49 starts a timer counter T2 upon reception of the vertical synchronization signal.

When the value of the timer counter T2 has reached a predetermined value, the MPU 49 permits the record image data control device 53 to receive a horizontal synchronization signal generated by the record control device 48 upon incidence of a laser beam onto the stationary mirror 46 arranged in the optical path of the laser beam.

The record image data control device 53 transfers binary data for one line from each line buffer in the ring buffer 54 in response to the horizontal synchronization signals input from the record control device 48 at predetermined time intervals.

The record control device 48 ON/OFF-controls the laser diode 17 in accordance with binary data for one line supplied from the line buffer in the ring buffer 54. At the same time, the record control device 48 starts the image forming unit 5 to form a toner image on the photosensitive drum 21. Note that the output timing of the vertical synchronization signal is set so that the transfer start position matches a desired position on the record medium P when the photosensitive drum 21 on which the toner image is formed rotates to the transfer position to the record medium P.

When the record medium P is further conveyed along with the image record operation until its trailing end has passed the actuator, and the actuator returns to its home position, the actuator opens the optical path of the photointerrupter used as the registration sensor 31b. Thus, the record control device 48 detects the trailing end of the record medium P.

Simultaneously with the detection of the trailing end of the record medium P, the record control device 48 starts a timer counter T3. When the value of the timer counter T3 has reached a predetermined value, the record control device 48 outputs a new page request signal to the record image data control device 53.

The above explanation is common to the respective embodiments, and a portion unique to the first embodiment will be described below.

Figure 7:
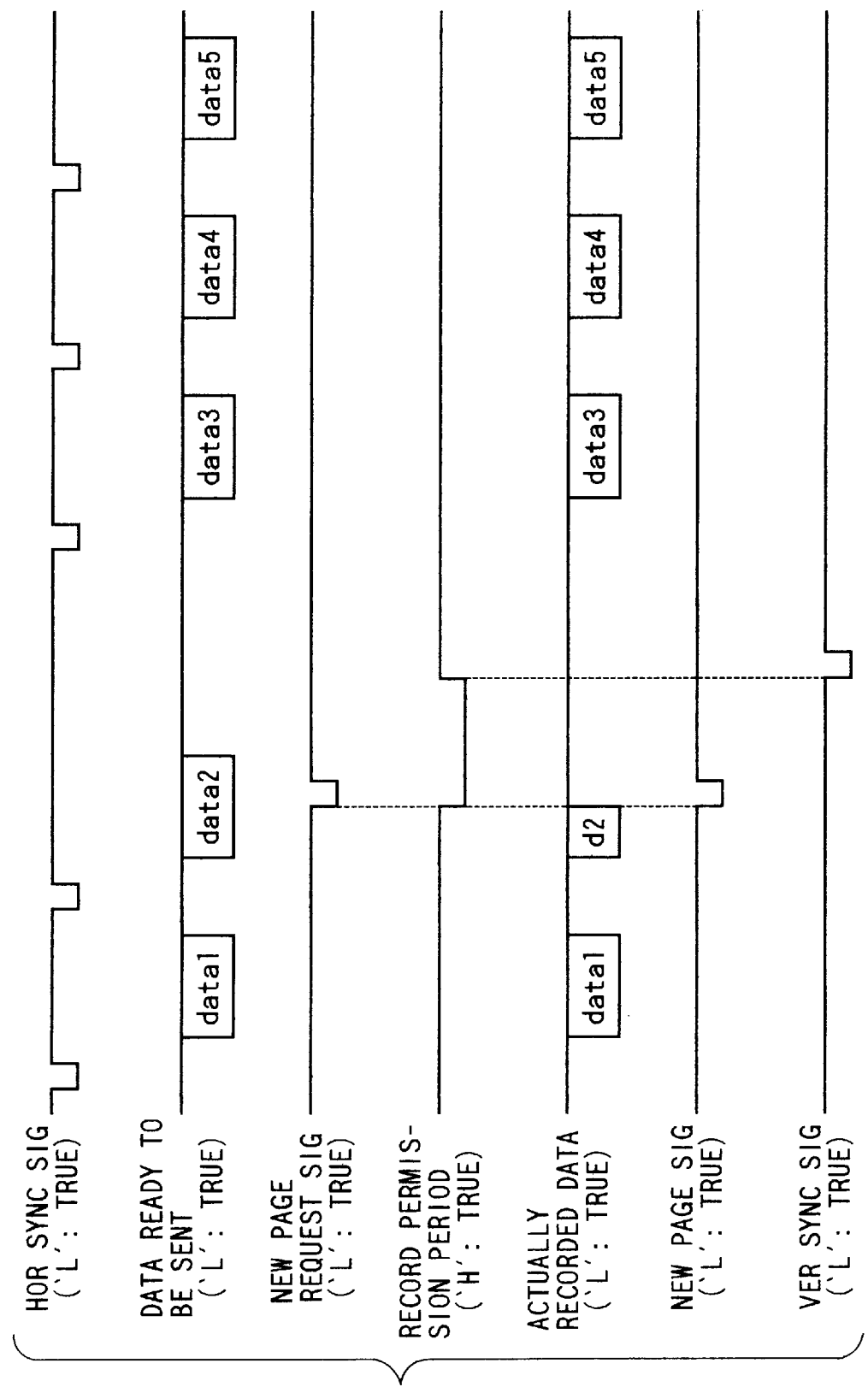
FIG. 7 is a timing chart showing the contents according to the first embodiment of the present invention.

FIG. 7 is a timing chart of the first embodiment.

After the operation described in the common explanation, upon reception of the new page request signal output from the record control device 48, the record image data control device 53 immediately interrupts the output operation of binary data to the record control device 48 independently of whether or not it is sending data. At the same time, the record image data control device 53 inhibits reception of any further horizontal synchronization signal from the record control evict 48 so as to inhibit continuation of the record operation.

Upon interruption of the binary data output operation, the record image data control device 53 checks if image data for the next line and subsequent lines present. If image data is present, the control device 53 outputs a new page signal to the record control device 48. Also, the control device 53 sets a line next to the line of interest upon interruption to be the next record start line.

Upon reception of the new page signal from the record image data control device 53, the record control device 48 separates one of record media P set in the first or second cassette 29 or 30, conveys the separated record medium P, and performs a record operation of the next page. In this case, the record operation is restarted from a line next to the line of interest upon interruption of the record operation.

A portion unique to the second embodiment will be described below.

Figure 8:
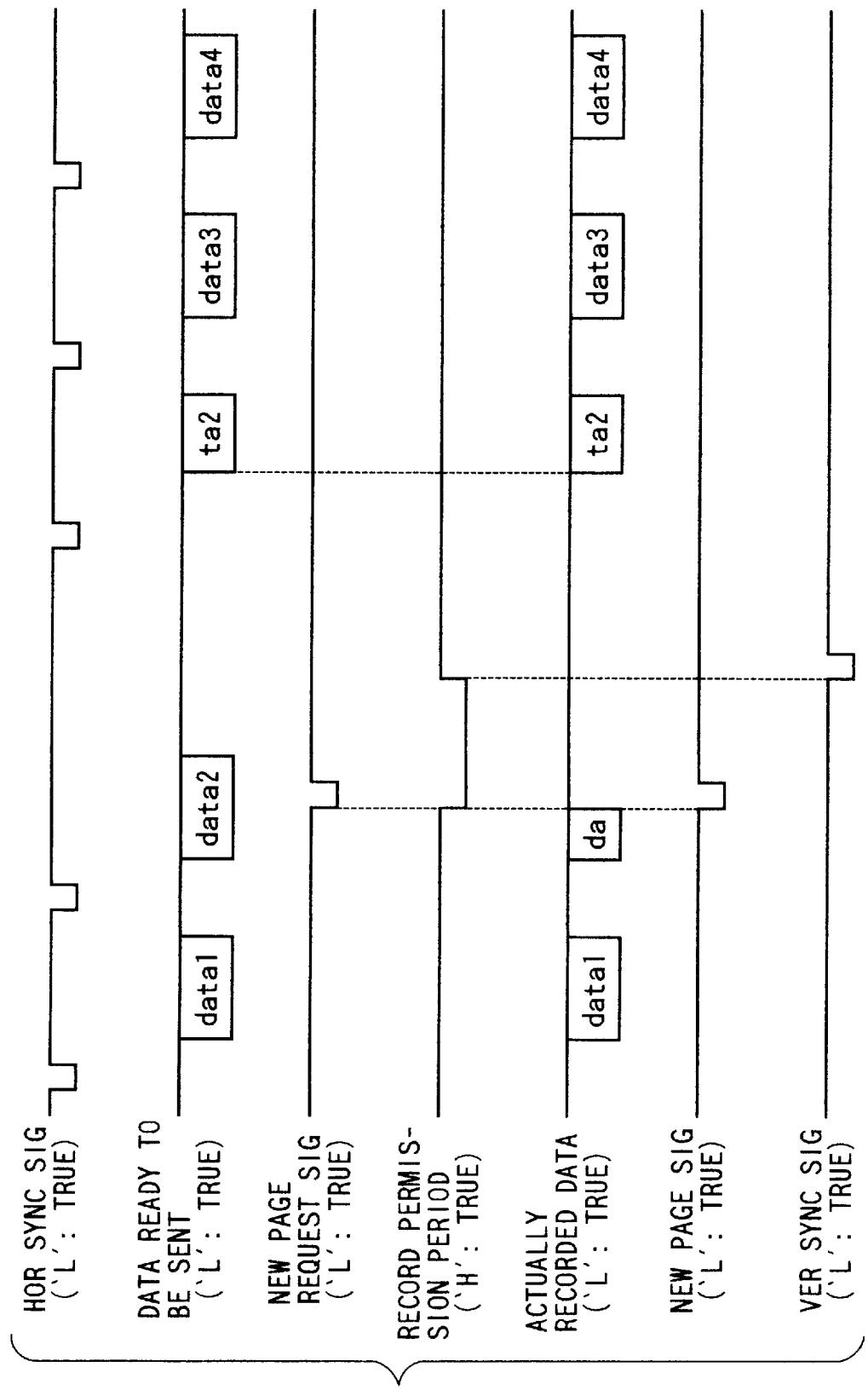
FIG. 8 is a timing chart showing the contents according to the second embodiment of the present invention.

FIG. 8 is a timing chart of the second embodiment.

As has been described in the common explanation, the record image data control device 53 outputs data for one line in synchronism with the horizontal synchronization signal received from the record control device 48. In this case, simultaneously with the output operation, the control device 53 writes data "0" in the RAM area in which the output data was stored.

Upon reception of the new page request signal output from the record control device 48, the record image data control device 53 immediately interrupts the output operation of binary data to the record control device 48 independently of whether or not it is performing a data output operation. At the same time, the record image data control device 53 inhibits reception of any further horizontal synchronization signal from the record control evict 48 so as to inhibit continuation of the record operation.

The record image data control device 53 checks if line data is being output upon interruption of the binary data output operation and data remains in the line of interest or image data in the next line and subsequent lines are present. If either data is present, the control device 53 outputs a new page signal to the record control device 48.

The control device 53 sets the start position of the line of interest upon interruption to be the next record start line position. In this case, since "0" is stored as the data contents of the RAM area in which recorded data was stored, recorded data of the previous page is not repetitively recorded in the record operation of the line of interest, and data of a pixel next to the last recorded pixel upon interruption of the record operation becomes effective data.

Upon reception of the new page signal from the record image data control device 53, the record control device 48 separates one of record media P set in the first or second cassette 29 or 30, conveys the separated record medium P, and performs a record operation of the next page. In this case, on the next page, the record operation is restarted from a pixel next to the last recorded pixel upon interruption of the record operation.

A portion unique to the third embodiment will be described below.

FIG. 9 is a timing chart of the third embodiment.

After the operation described in the common explanation, upon reception of the new page request signal output from the record control device 48, the record image data control device 53 interrupts the output operation of binary data to the record control device 48 after the output operation of all data in the output line is completed. At the same time, the record image data control device 53 inhibits reception of any further horizontal synchronization signal from the record control evict 48 so as to inhibit continuation of the record operation.

The record image data control device 53 checks if image data in the next line and subsequent lines are present upon interruption of the binary data output operation. If such image data are present, the control device 53 outputs a new page signal to the record control device 48. The control device 53 sets a line next to the already output line to be the next record start line.

Upon reception of the new page signal from the record image data control device 53, the record control device 48 separates one of record media P set in the first or second cassette 29 or 30, conveys the separated record medium P, and performs a record operation of the next page. In this case, on the next page, the record operation is restarted from a line next to the record line upon interruption of the record operation.

A portion unique to the fourth embodiment will be described below.

The contents of this embodiment are used in addition to the above-mentioned first, second, and third embodiments. In this embodiment, an input value A is set in advance by a key input from the console unit 9. Alternatively, the input value A is set by fetching a value voltage-divided by a power supply voltage with a volume resistor into an A/D converter. The input value A is held in the internal RAM of the record control evict 48 until a new value is input.

The input value A held in the RAM is compared with the value of the timer T3, which is started when the record control device 48 detects the trailing end of the record medium P. If the input value A coincides with the value of the time T, the record control device 48 outputs a new page request signal to the record image control device 53. According to this embodiment, the recognition position of the trailing end of the recordable range of the record medium can be appropriately adjusted.

The preferred embodiments of the present invention have been described with reference to the accompanying drawings. However, the invention is not limited to the above embodiments, and even when a change in design is made within the scope of the present invention, such change is included in the present invention.

As described above, according to the present invention, when the record position has reached the trailing end of the recordable range of a record medium during a record operation and data to be recorded on the page still remains, the record operation is immediately interrupted upon detection of the trailing end and the record operation is restarted from the next line after a new page is set, the record operation is immediately interrupted upon detection of the trailing end and the record operation is restarted from the next pixel after a new page is set, or the record operation is interrupted after the record operation of the line of interest is completed upon detection of the trailing end and the record operation is restarted from the next line after a new page is set. For this reason, even when the image data output control unit sets the maximum number of recordable lines to be larger than that calculated based on the worst values of the leading end & trailing end detection precision of the record medium, convey speed, expansion/shrinkage of the record medium, and the like, a predetermined margin or larger can be assured at the trailing end side, and the record operation can be performed without omitting an image. Also, according to the present invention, an input means can be used to appropriately change the criterion used in detection of the trailing end of the recordable range.

Note that when the timer T3 stops, the record control device 48 of the third embodiment changes the record permission period signal to LOW level only after completion of the record operation of a line (data2 in FIG. 9) which is being currently recorded instead of immediately changing the record permission period signal (FIG. 9) to LOW level. For this reason, as shown in FIG. 9, all data for one line of data2 can be recorded.

What is claimed is:

1. An image record apparatus comprising:

record means for recording an image on a record medium in accordance with image data;

convey means for conveying the record medium to a record position of said record means;

trailing end detection means for detecting a trailing end of the record medium which is being conveyed by said convey means;

convey amount count means adapted to be started upon detection of the trailing end by said trailing end detection means to detect a convey amount of the record medium;

record control means for controlling said record means, and for outputting image data to said record means;

image data output means for sending image data to said record control means; and data amount count means adapted to be started upon detection of the trailing end by said trailing end detection means to detect an output data amount of the image data from said image data output means, wherein said record control means immediately interrupts the output operation of the image data to said record means when a count value of said convey amount convey means has reached a first predetermined value, wherein said image data output means immediately interrupts the send operation of the image data to said record control means when a count value of said data amount count means has reached a second predetermined value, determines whether image data next to the image data whose send operation has been interrupted is present, and sets the next image data to be record start image data on a next page when it is determined that the next image data is present, and wherein each of the first predetermined value and the second predetermined value corresponds to a distance between said trailing end detection means and said record position.

2. An apparatus according to claim 1, wherein the next image data is image data in a line next to the line of the image data whose send operation has been interrupted.

3. An apparatus according to claim 1, wherein the next image data is image data of a pixel next to a pixel of the image data whose send operation has been interrupted.

4. An apparatus according to claim 1, further comprising input means for inputting the predetermined value by an operator.

5. An image record apparatus comprising:

record means for recording an image on a record medium in accordance with image data;

convey means for conveying the record medium to a record position of said record means;

trailing end detection means for detecting a trailing end of the record medium which is being conveyed by said convey means;

convey amount count means adapted to be started upon detection of the trailing end by said trailing end detection means to detect a convey amount of the record medium;

record control means for controlling said record means, and for outputting image data to said record means;

image data output means for sending image data to said record control means; and data amount count means adapted to be started upon detection of the trailing end by said trailing end detection means to detect an output data amount of the image data from said image data output means, wherein said record control means immediately interrupts the output operation of the image data to said record means when a count value of said convey amount convey means has reached a first predetermined value, wherein said image data output means interrupts the send operation of the image data upon completion of the send operation of the image data for a line which is being sent when a count value of said data amount count means has reached a second predetermined value, determines whether image data remains, and sets a line next to the line upon interruption of the send operation to be a record start line when it is determined that the next image data remains, and wherein each of the first predetermined value and the second predetermined value corresponds to a distance between said trailing end detection means and said record position.

6. An apparatus according to claim 5, further comprising input means for inputting the predetermined value by an operator.

7. A record apparatus comprising:

record means for recording data on a record paper;

convey means for conveying the record paper to said record means;

record control means for controlling said record means;

output means for outputting data to said record means;

detect means for detecting a position of a trailing end of the record paper, wherein said record control means controls a record operation of said record means on the basis of a position of the trailing end of the record paper detected by said detect means, and said output means controls data output on the basis of the position of the trailing end of the record paper detected by said detect means and wherein said record control means causes said record means to t terminate the recording of data being recorded onto the record paper in accordance with the position of the trailing end of the record paper detected by said detect means, and said output means interrupts the output of data to said record control means in accordance with the position of the trailing end of the record paper by said detect means.

* * * * *

UNITED STATES PATENT AND TRADEMARK OFFICE
CERTIFICATE OF CORRECTION

PATENT NO. : 5,923,441
DATED : July 13, 1999
INVENTOR(S) : YASUO KOMADA, ET AL.

It is certified that error appears in the above-identified patent and that said Letters Patent is hereby corrected as shown below:

ON THE TITLE PAGE:
Insert after item [73] --[*] Notice:

-This patent issued on a continued prosecution application filed under 37 CFR 1.53(d), and is subject to the twenty year patent term provisions of 35 U.S.C. 154(a)(2).-.

COLUMN 3:
Line 23, "an" should read -a-.

COLUMN 9:

Line 42, "voltage-divided" should read -voltage divided-.

COLUMN 12:
Line 18, "means;" should read -means; and-; and
Line 27, "t terminate" should read -terminate-.

Signed and Sealed this

Eighteenth Day of April, 2000

Attest:

Q. TODD DICKINSON

*Attesting Officer*   *Director of Patents and Trademarks*